United States Patent
Kottke et al.

[11] Patent Number: 5,869,204
[45] Date of Patent: Feb. 9, 1999

[54] BATTERY LATCH FOR A COMMUNICATION DEVICE

[75] Inventors: Wille Kottke, Miami; Julio C. Castañeda, Coral Springs, both of Fla.; Aaron P. Clark, Buford, Ga.

[73] Assignee: Motorola, Inc., Schaumburg, Ill.

[21] Appl. No.: 878,869

[22] Filed: Jun. 19, 1997

Related U.S. Application Data

[63] Continuation of Ser. No. 770,619, Dec. 19, 1996, abandoned, which is a continuation of Ser. No. 562,479, Nov. 24, 1995, abandoned.

[51] Int. Cl.[6] .................................................. H01M 2/10
[52] U.S. Cl. ............................................. 429/100; 429/96
[58] Field of Search ................................ 429/100, 96, 99

[56] References Cited

U.S. PATENT DOCUMENTS

| | | | |
|---|---|---|---|
| 5,298,347 | 3/1994 | Aksoy et al. | 429/98 |
| 5,314,763 | 5/1994 | Aksoy et al. | 429/97 |
| 5,415,955 | 5/1995 | Kobayashi et al. | 429/100 X |
| 5,508,123 | 4/1996 | Fan | 429/100 X |
| 5,604,050 | 2/1997 | Brunette et al. | 429/96 X |

*Primary Examiner*—John S. Maples
*Attorney, Agent, or Firm*—M. Mansour Ghomeshi

[57] ABSTRACT

A battery package (100) includes a latch (106) for easy attachment to a radio (402). Engagement of the battery package (100) to the radio is accomplished via matching a plurality of retaining rails (110) via notches (112) with a plurality of opposing and complementary retaining rails on the radio (402). A simple sliding motion locks the latch (106) to the radio (402). Disengagement requires little force as the latch (106) is depressed in the same direction as the battery package (100) is slid down. The battery comes to a stop when an alignment of the notches (112) with the radio retaining rails has taken place. An effortless lift separates the battery package (100) from the radio (402).

8 Claims, 4 Drawing Sheets

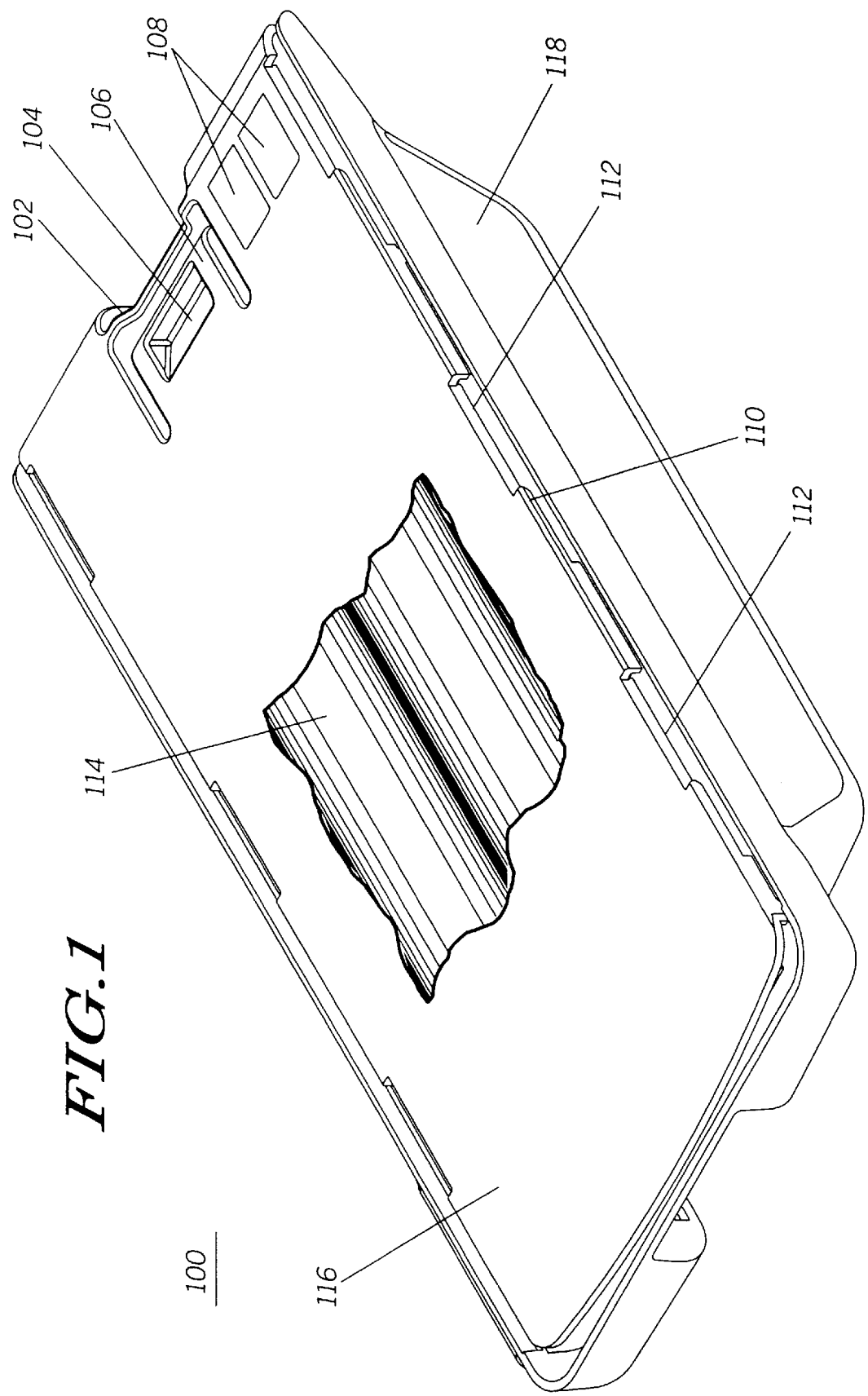

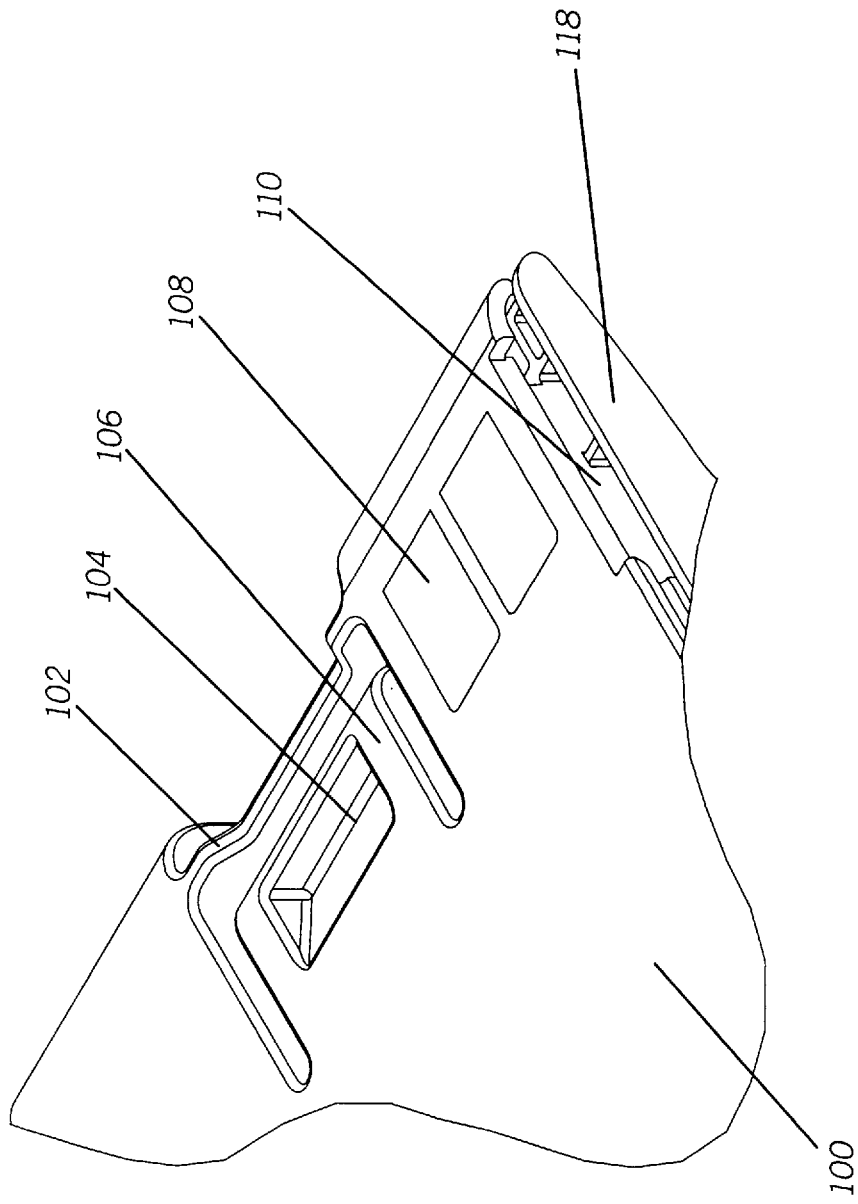

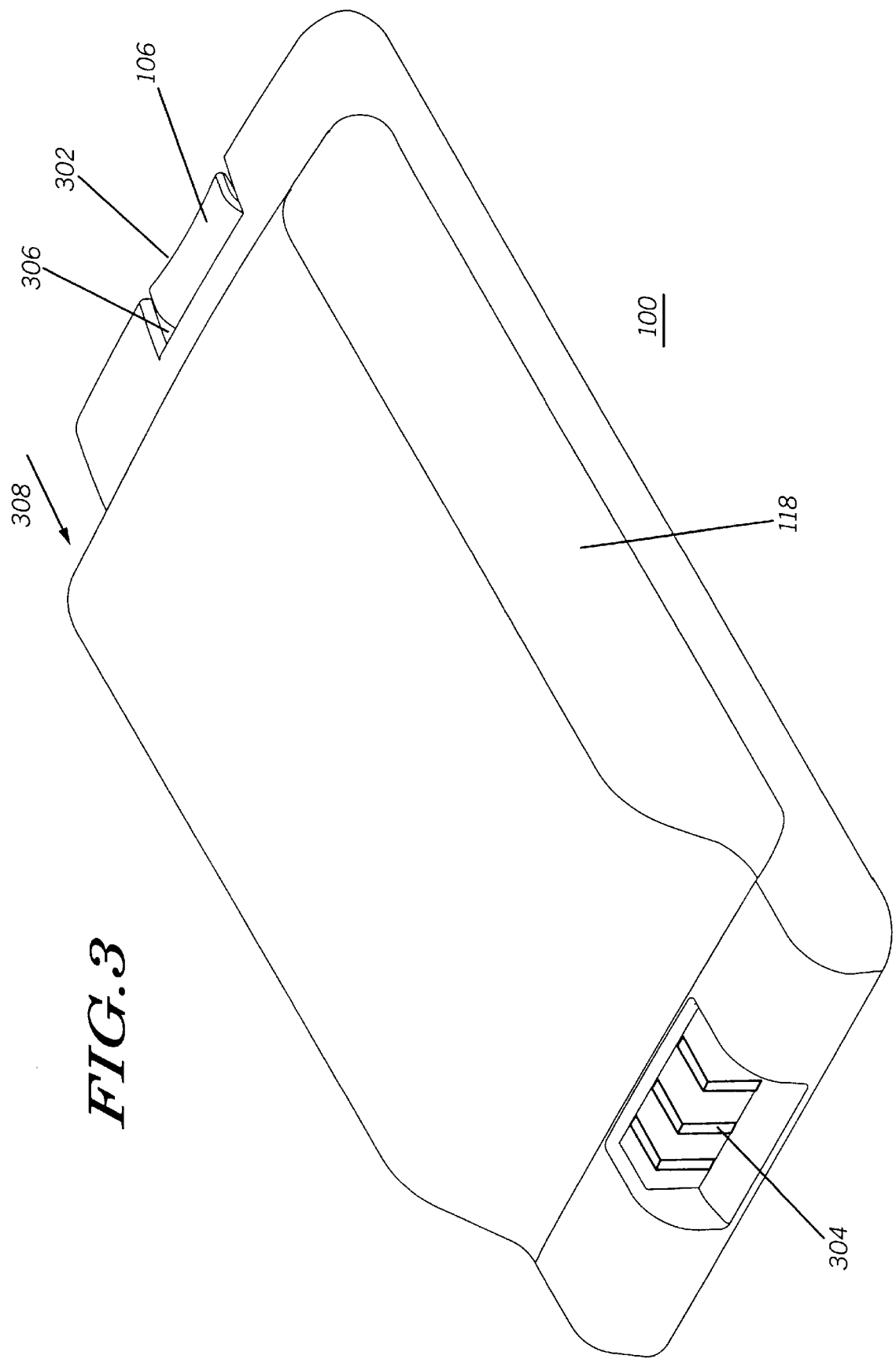

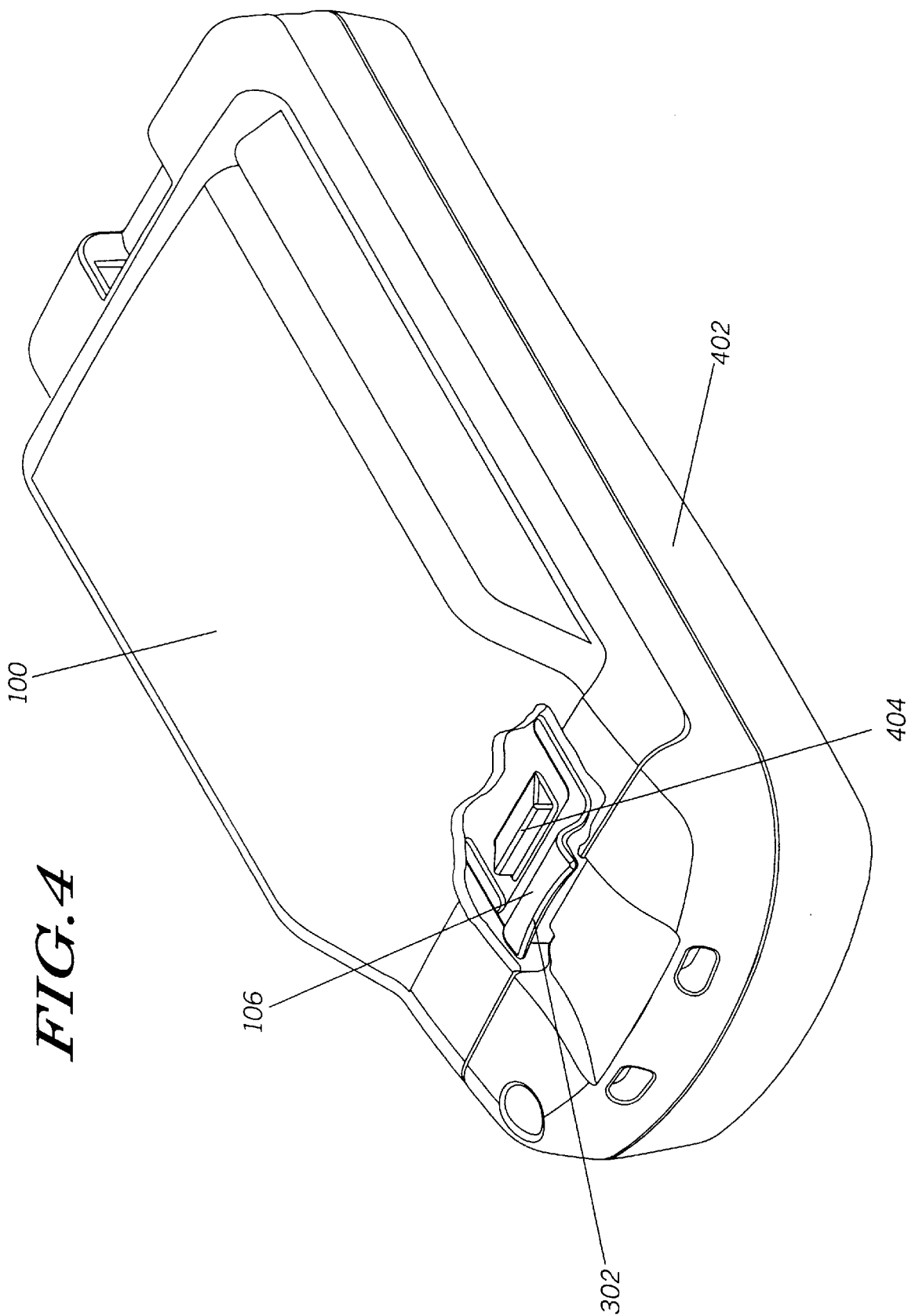

BATTERY LATCH FOR A COMMUNICATION DEVICE

This is a continuation of U.S. application Ser. No. 08/770,619 filed Dec. 19, 1996, which was a file wrapper continuation of U.S. application Ser. No. 08/562,479 filed Nov. 24, 1995, and now both abandoned.

TECHNICAL FIELD

This invention is generally related to latch devices and more particularly to latch devices for battery packages for portable communication device.

BACKGROUND

The design of battery latches particularly ones on a portable electronic device is known in the art. However, present battery latches are plagued with mechanical reliability issues due to an inability to survive abuse over the life of the battery. These battery latches have finger grips which require a significant amount of force, in a number of directions, in order to engage and disengage the battery. As a result of the direction changes, the design of the battery latches is not ergonomically efficient. Moreover, these battery latches break when in use or when the electronic device is being transported. A need exists for an ergonomically designed battery latch which has ease of access, protective features, and a nominal force to actuate the battery latch in the direction of battery engagement and disengagement.

BRIEF DESCRIPTION OF THE DRAWINGS

FIG. 1 shows a battery package in accordance with the present invention.

FIG. 2 shows details of the latch area of the battery package of FIG. 1 in accordance with the present invention.

FIG. 3 shows the battery package of FIG. 1 in a flipped position.

FIG. 4 shows a communication device in accordance with the present invention.

DETAILED DESCRIPTION OF THE PREFERRED EMBODIMENT

The design of battery latches on portable electronic devices has been limited in its effectiveness primarily due to inefficient mechanical features. A variety of battery latches are positioned in locations that are difficult to access, and have extending finger grips which are not provided with protective elements. Other battery latches require a significant amount of force to actuate. In addition, the direction of the force to actuate the latch relative to the direction in which the battery is disengaged is not the same. The principles of the present invention provide for an ergonomically designed battery latch which is readily accessible, is protected from user abuse, and requires a nominal actuation force that leads into disengagement.

Referring to FIG. 1, a battery package 100 for attaching to a radio, is shown in accordance with the present invention. The battery package 100 comprises a cover 116 including a flexible latch 106. The flexible latch 106 has a cavity 104 wherein the battery package 100 locks to the radioat a corresponding tab 404. A stop bar 102 is provided to prevent the flexible latch 106 from being damaged due to excessive movement when the battery 100 is not latched to the radio. In the preferred embodiment, the flexible latch 106, the stop bar 102, and the cover 116 are uniformly molded using a single shot overmolded process. At least two battery contacts 08 provide an electrical connection to the radio. The battery package 100 includes a housing 118. A battery cell 114 is provided within the housing 118. The housing 118 includes a plurality of retaining rails 110 which match a plurality of opposing and complimentary retaining rails on the radio in order for the battery package 100 to slide onto the radio. The plurality of notches 112 corresponds with the radio retaining rails in order to allow the battery package 100 to engage thereto and to slide upward until the cavity 104 locks the battery package 100 to the radio.

In this configuration, the battery package 100 is able to engage in one direction. Indeed, once the plurality of notches (features) 112 are aligned with the corresponding plurality of retaining rails on the radio, the battery package 100 slides upward until the cavity 104 snaps into place. Likewise, the battery package 100 is disengaged while moving in a direction which is commensurate with the sliding of the battery 100 away from the radio. More specifically, the battery package 100 is removed by gently pulling back the flexible latch 106, then sliding the battery package 100 down until it contacts the plurality of retaining rails 110 and stops. In other words, the depression of the latch 106 is commensurate with the sliding of the battery package 100 away from the radio. At this point, the battery package 100 can be removed from the radio by a simple lift. Since the depression (308) of the latch 106 is generally in the same direction as the direction of the sliding motion, no strong force is needed for the disengagement of the battery from the radio.

Referring to FIG. 2, a enlarged view of the top-half of the battery package 100 is shown to better accentuate details of the latch 106. As can be seen, the latch 106 is stopped in one direction by the stop bar 102 and the housing 118 in the other direction. These stopping mechanisms are intended to prevent damage to the battery either on the radio or away from the radio.

Referring to FIG. 3, a top view of the battery package 100 is shown in accordance with the present invention. The housing 118 includes a plurality of charging contacts 304. The flexible latch 106 is in the center of the battery package 100, where it is readily accessible for actuation. The flexible latch 106 includes a finger grip 302. The finger grip 302 is curved to freely accept a finger for easy activation of the flexible latch 106. A slot 306 is provided on the housing 118 to accommodate the flexible latch 106. Furthermore, the slot 306 prevents the flexible latch 106 from being depressed too far, thereby protecting the flexible latch 106 from damage or breakage. Designed in this manner, the flexible latch 106 absorbs any actuation stress in either direction on or off the radio.

In general, to actuate an ergonomically designed battery latch, it is recommended that a force of between 0.5 lbs. and 4 lbs. be applied. The force required to actuate the flexible latch 106 is 2 lbs. This nominal actuation force is in the midrange of the recommended ergonomic force. The battery latch 106 is actuated by placing force on the finger grip 302 in a direction towards the bottom of the radio. The direction of the battery latch 106 actuation is in the same direction as the removal of the battery package 100.

Referring to FIG. 4, a radio communication device 402 is shown in accordance with the present invention. The radio communication device 402 is attached to the battery package 100. As can be seen, when the finger grip 302 is depressed, the battery package 100 slides away from the radio communication device 402 in the same direction that the flexible latch 106 is depressed. In other words, the actuation of the flexible latch 106 is in the same direction as the disengagement of the battery package 100.

To summarize, the battery package 100 used as an energy source for a radio communication device 402 includes a flexible latch 106. Engagement of the battery 100 to the radio is accomplished via matching a plurality of retaining rails 110 via notches 112 with a plurality of opposing and complementary retaining rails (not shown) on the radio 402. A simple sliding motion locks the latch 106 to the radio 402. Disengagement requires little force as the latch 106 is depressed in the same direction as the battery 100 is slid down. The battery comes to a stop when an alignment of the notches 112 with the radio retaining rails has taken place. An effortless lift separates the battery 100 from the radio 402. The benefits of the ergonomically designed flexible latch 106 in the present invention are numerous. First, the flexible latch is easily accessible due to its central location on the battery package. Second, the flexible latch is protected from user abuse by the slot and stop bar. Third, the requisite force needed to actuate the flexible latch is nominal. Forth, the battery package is engaged and disengaged in a smooth and fluid movement. Yet another benefit is that the latch assembly of the recessed area surrounding the latch 106 protects the latch from breakage when the battery 100 is attached to the radio 402.

What is claimed is:

1. A battery package for attaching to a radio and providing power thereto, the battery package comprising:
    a housing, including:
        a plurality of retaining rails to match a plurality of opposing and complimentary retaining rails on the radio in order to allow the battery package to slide onto the radio;
    at least one battery cell located in the housing;
    at least one battery contact for providing an electrical connection from the at least one cell to the radio;
    a cover for coupling to the housing and providing a cover therefor, the cover including:
        a flexible latch portion providing for the locking of the battery package to the radio, the latch having a finger grip portion for allowing the battery package to slide away from the radio in generally the same direction that the latch is depressed; and
        a stop bar for preventing excessive movement in the latch in order to prevent damage thereto.

2. The battery package of claim 1, wherein the housing includes a plastic housing.

3. The battery package of claim 1, wherein the cover includes a plastic housing.

4. The battery package of claim 3, wherein the cover includes a molded plastic housing and the latch is an integral part thereto.

5. The battery package of claim 1, wherein the cover, the latch, and the stop bar are molded in a single shot.

6. A battery package for attaching to a radio and providing power thereto, the radio having a radio housing, the battery package comprising:
    a housing having a plurality of retaining rails to match a plurality of opposing and complimentary retaining rails on the radio;
    at least one battery cell located in the battery housing;
    battery contacts;
    a cover for covering the at least one battery cell, the cover including:
        a flexible latch portion providing for the locking of the battery package to the radio without using a spring, the latch having a finger grip portion for allowing the depression of the latch to be in generally the same direction as the sliding of the battery package away from the radio; and
        a plurality of notches corresponding with the radio retaining rails in order to allow the battery package to engage thereto and slide upward until the latch locks the battery package to the radio.

7. The battery package of claim 6, wherein the battery housing includes a slot to accommodate the latch.

8. A radio communication device, comprising:
    a radio housing having a plurality of retaining rails;
    a receiver located in the housing for receiving a radio frequency signal;
    a battery package to be attached to the radio communication device for powering up the receiver, the battery package comprising:
        a battery housing having a plurality of retaining rails to match the plurality of opposing and complimentary retaining rails on the radio;
        at least one battery cell located in the battery housing;
        at least two battery contacts for electrically connecting the at least one battery cell to the receiver; and
        a battery cover for covering the battery housing, the battery cover including:
            a latch portion flexibly attached thereto for allowing the battery package to be removed from the radio housing in generally the same direction as the latch is depressed; and
            a protection bar for limiting the movement of the latch in order to prevent damage thereto.

* * * * *